United States Patent
Lobinger et al.

(10) Patent No.: US 7,415,249 B2
(45) Date of Patent: Aug. 19, 2008

(54) METHOD FOR OPERATING A MOBILE RADIO COMMUNICATIONS SYSTEM AND STATIONS THEREOF

(75) Inventors: Andreas Lobinger, Miesbach (DE); Bernhard Raaf, Neuried (DE); Alexander Seeger, Feldkirchen (DE); Ralf Wiedmann, München (DE)

(73) Assignee: Siemens Aktiengesellschaft, Munich (DE)

( * ) Notice: Subject to any disclaimer, the term of this patent is extended or adjusted under 35 U.S.C. 154(b) by 188 days.

(21) Appl. No.: 10/482,723

(22) PCT Filed: Jun. 11, 2002

(86) PCT No.: PCT/DE02/02131

§ 371 (c)(1),
(2), (4) Date: Jan. 2, 2004

(87) PCT Pub. No.: WO03/005605

PCT Pub. Date: Jan. 16, 2003

(65) Prior Publication Data

US 2004/0171357 A1  Sep. 2, 2004

(30) Foreign Application Priority Data

Jul. 2, 2001  (DE) .................. 101 31 946

(51) Int. Cl.
*H04B 1/02* (2006.01)
*H04B 7/00* (2006.01)
*H03C 7/02* (2006.01)
*H04L 27/00* (2006.01)

(52) U.S. Cl. ............... 455/101; 455/69; 375/299; 375/347

(58) Field of Classification Search ............ 455/69, 455/561, 562.1, 101, 522, 179.1; 342/368; 375/299, 296, 347, 349
See application file for complete search history.

(56) References Cited

U.S. PATENT DOCUMENTS

| 5,634,199 A | 5/1997 | Gerlach et al. |
| 6,192,256 B1* | 2/2001 | Whinnett ................ 455/562.1 |
| 6,628,631 B1* | 9/2003 | Mazawa et al. ............ 370/331 |
| 6,754,286 B2* | 6/2004 | Hottinen et al. ............ 375/299 |
| 6,754,473 B1* | 6/2004 | Hwang et al. .............. 455/101 |
| 2003/0109226 A1* | 6/2003 | Brunner et al. .............. 455/69 |

FOREIGN PATENT DOCUMENTS

| DE | 100 32 426 A1 | 1/2002 |
| EP | 0 806 844 A1 | 11/1997 |

OTHER PUBLICATIONS

XP002220796, "UMTS Physical Layer Procedures (FDD), Chapter 7; Closed loop mode transmit diversity," Mar. 2000, pp. 27-34.

* cited by examiner

*Primary Examiner*—Duc Nguyen
*Assistant Examiner*—Michael T Thier (57) ABSTRACT

The present invention seeks to estimate a dedicated channel of the downlink transmission from a base station (BS) to a subscriber station (MS) in a mobile radio communications system with antenna diversity. To this end, the subscriber station (MS) calculates a first estimation of the dedicated channel from an estimation of a global channel (CPICH) while using a weighting vector (W, W') used by the base station (BS) for the beam forming of the dedicated channel.

22 Claims, 5 Drawing Sheets

METHOD FOR OPERATING A MOBILE RADIO COMMUNICATIONS SYSTEM AND STATIONS THEREOF

BACKGROUND OF THE INVENTION

The present invention relates to a method for operating a mobile radio communications system, as well as to a subscriber station and a base station which are suitable for implementing such method.

In a mobile radio communications system, such as the UMTS system, several antennas are employed on a base station for the purpose of exploiting spatial diversity. For transmitting data on dedicated channels to individual base stations, the antennas are respectively weighted with different weighting factors. Such weighting factors are generally complex numbers consisting of an amount component and a phase component. A set of weighting factors employed simultaneously for a dedicated channel is also referred to by the term weighting vector. As a result of weighting, a radiation beam in the direction of the location of the respective mobile radio station is produced for each subscriber station in a cell (beam forming).

To allow correct decoding of the useful data symbols transmitted on a dedicated channel, a subscriber station requires a channel estimation indicating at least the phase shift occurring on the channel. Such channel estimation is conventionally performed by transmitting pilot bits on the dedicated channel which are known to the subscriber station so that it can determine the channel's phase shift by comparing received symbol phases of the pilot bits with expected phases.

A first preferred application of the present invention is estimating the dedicated channel of the downlink transmission from a base station to a subscriber station in a mobile radio communications system with antenna diversity.

Channel estimation via the dedicated channel's pilot bits (also referred to below as dedicated pilot bits) is conventionally of poor quality and very noisy. This occurs because, like the rest of the channel, the dedicated pilot bits are transmitted at a power level selected as low as possible in order to minimize interference on other subscriber stations for which the dedicated channel is not intended.

A method of channel estimation is also known, particularly in the case of CDMA systems, whereby global pilot signals, which like the dedicated pilot bits are pre-defined signals, are transmitted from the base station. Being transmitted unweighted, they can be received throughout the mobile radio cell provisioned by the base station (or within the provisioned cell sector in the case of a sectorized base station). Since global pilot signals contain useful information for all the mobile stations within the cell's domain, there is the possibility of the global pilot signals interfering with the dedicated channels. The global pilot signals are therefore transmitted at a higher level of power than the dedicated pilot bits and permit a higher quality estimation. It must be added, however, that an estimation obtained by the subscriber station for a global channel is not automatically transferable to a dedicated channel because the relative phases with which a global and dedicated channel are transmitted from the individual antennas of the base station differ depending on the weighting vector employed. If the subscriber station is aware of the weighting vector employed, it can calculate an estimation of the dedicated channel from an estimation of the global channel. However, this knowledge is only present in the case of a system employing what is termed closed-loop beam forming, where the subscriber station is aware of the weighting vector to be used by the base station having selected it itself and having specified it to the base station. The subscriber station will, however, lack this knowledge in that case if it is prevented by an interruption in transmission from receiving the base station's global pilot bits or from transmitting the selected weighting vector, or if it has not yet had an opportunity to specify a weighting vector to the base station when closed-loop beam forming is being initialized. Calculation is generally not possible in the case of open-loop systems where the base station selects the weighting vector.

Another preferred application of the present invention is controlling beam forming in a mobile radio communications system whereby, from a multiplicity of long-term weighting vectors, a base station selects or linearly combines a short-term weighting vector employed for downlink beam forming with the aid of short-term feedback information supplied by the subscriber station. A system of this type is described, for example, in German patent application DE 100 32 426.6 submitted by the applicant on Jul. 4, 2000.

A provision of conventional systems of this type is that the long-term weighting vectors are respectively determined and transmitted to the base stations by the subscriber stations. The transmission capacity available for transmitting both the short-term feedback information and long-term weighting vectors is limited to a total of one bit per timeslot of the uplink signal. The short-term feedback information has to be transmitted frequently to allow beam forming to adapt quickly to fast fading; this, however, is blocked or will respond more sluggishly if new long-term weighting vectors have to be transmitted to the base station.

Each individual subscriber station within the system must, in a system of this type, also be able to determine the long-term weighting vectors, which increases the complexity of the subscriber stations.

SUMMARY OF THE INVENTION

An object of the present invention is therefore, to provide a method for operating a mobile radio communications system which, firstly, provides the essential requirements for enabling the dedicated channel of the downlink transmission also to be estimated in the above-cited special cases as part of closed-loop beam forming as well as in open-loop beam forming with substantially the same measure of quality as that with which the global channel can be estimated, without having to accept a consequent increase in interference at the other subscriber stations due, for example, to higher-level transmitting power and the like, and/or, secondly, also allows consistently agile controlling of downlink beam forming when the long-term weighting vectors are being updated.

Such object is achieved whereby, applying the method according to the present invention, information specifying weighting vectors used for the dedicated channel's beam forming is transmitted to the subscriber station by the base station.

If the information specifies the weighting vector used by the base station in each case as the next such vector, as part of the first application of the present invention this will enable the subscriber station via the specified weighting vector to calculate a first estimation of the dedicated channel on said the subscriber station from an estimation of a global channel.

As a supplement to this, a second estimation can be obtained in conventional ways by performing a measurement on the dedicated channel and a concluding estimation calculated by taking a mean of the first and second estimation or by performing some other arithmetical linking operation on these.

The weighting vector used can be established on the base station; this case being designated open-loop beam forming.

The base station expediently transmits the information about the weighting vector used in discretized form in the case of a system like the UMTS system where base stations with two antennas are employed; for example, in the form of three-bit words of which in each case two bits indicate a phase difference between the weighting factors assigned to the two antennas and one bit indicates the ratio of their amounts.

To obviate transmission errors, the base station expediently transmits the information specifying the weighting vector encoded with an error correction code. This can be done simply by transmitting the information at a higher level in the OSI layer model than the bit layer.

It is also possible for the base station itself not to obtain the information specifying the weighting vector but instead to receive in advance from the subscriber station information which specifies the weighting vector to be used and to transmit information derived from this back to the subscriber station. A scenario of this type can be used particularly in a system employing what is termed closed-loop beam forming.

In a case like this, transmitting the information from the base station back to the subscriber station serves primarily to confirm that the base station has correctly received the information specifying the weighting vector to be used which was transmitted in advance by the subscriber station. To this end, it may suffice to employ coarser discretizing for transmitting the information back to the subscriber station than for receiving the information. In other cases, it also can be advantageous to use finer discretizing, as will be described below.

It is also conceivable for the subscriber station to transmit to the base station information specifying a weighting vector which would allow the base station to receive the dedicated channel with maximum receive field strength, but for the base station not to use the specified weighting vector exactly but instead to undertake advance corrective adjustment of this weighting vector and use the resulting corrected weighting vector for beam forming, and for the information transmitted from the base station to the subscriber station therefore to be referred to this corrected weighting vector. A corrective adjustment of this kind advantageously can serve, in particular, to reduce interference on second subscriber stations for which the dedicated channel is not intended. Being aware of the weighting vectors to be used for the second subscriber stations, the base station is able to correct the weighting vector in such a manner that the receive field strength of a dedicated channel on a second subscriber station for which the channel is not intended is significantly reduced compared to the non-corrected case and is at the same time reduced by a significantly lesser extent at the subscriber station for which the channel is intended.

In an open-loop system, the base station establishes the weighting vector via a measurement which it performs on a received uplink signal coming from the subscriber station. Here, also, it can be expedient first to correct the weighting vector derived from such a measurement and then to transmit the information referred to the corrected vector to the subscriber station.

A further embodiment of the present invention provides for ensuring knowledge of the weighting vector at the subscriber station whereby said the subscriber station itself establishes the weighting vector to be used by the base station via measurements performed on the downlink signal, transmits information specifying the weighting vector to be used by the base station to the base station, and then uses the weighting vector established in this way for estimating the dedicated channel; which is to say, assumes when estimating the dedicated channel that the base station has actually formed said the dedicated channel using the established weighting vector. As such, the subscriber station estimates the channel directly via a weighting vector which it selects itself and then specifies it to the base station. In a case such as this, it basically is not necessary to transmit information specifying the weighting vector from the base station back to the subscriber station, but it is possible as confirmation of correct reception by the base station.

Provision can, however, be made for the base station itself to establish a weighting vector if it does not receive information specifying the weighting vector to be used from the subscriber station, and to transmit information specifying the established weighting vector to the subscriber station. Such a procedure is particularly useful during initializing of beam forming in closed-loop mode when the base station has to transmit the dedicated channel in weighted form but has not yet received any information about the weighting vector to be used from the subscriber station or, in what is termed the compressed mode of the UMTS system, if the uplink signal from the subscriber station to the base station is temporarily interrupted and the base station consequently does not receive any information from the subscriber station specifying the weighting vector to be used.

In the second application of the present invention, the information transmitted from the base station to the subscriber station specifying a weighting vector can be information specifying a weighting vector (possibly from among several) determined by the base station via the uplink signal from the subscriber station. This is because, in contrast to short-term feedback information, where fading effects play a major role and which consequently only can be determined to a limited extent on the base station in a frequency division duplex system, the weighting vectors can be measured on the base station, which has the advantage of not having to provide measuring equipment for this purpose at every individual terminal. The subscriber stations, therefore, can be lightweight, simple, and economically priced. One measuring device can be employed on the base station in multiplex mode for determining the long-term weighting vectors of several subscriber stations.

Additional features and advantages of the present invention are described in, and will be apparent from, the following Detailed Description of the Invention and the figures.

DETAILED DESCRIPTION OF THE INVENTION

Figure 1:
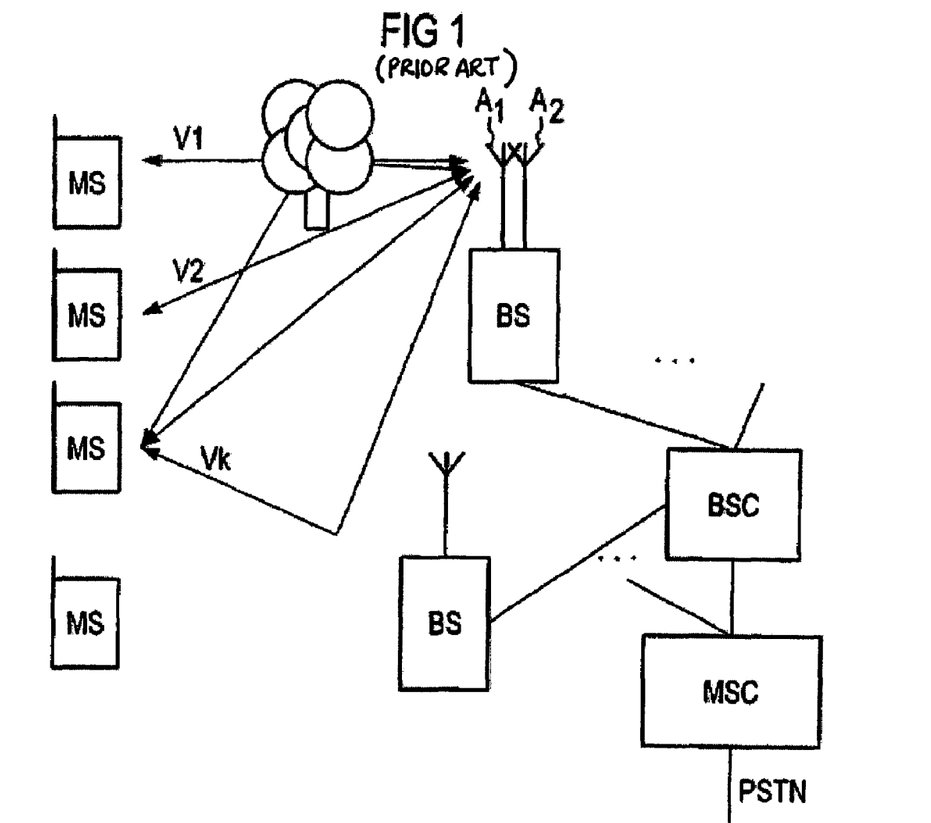
FIG. 1 is a block diagram of a radio communications system in which the present invention can be employed.

FIG. 1 shows the structure of a radio communications system in which the present invention can be employed. It consists of a multiplicity of mobile switching centers MSC which are internetworked or which set up access to a fixed public switched telephone network PSTN. These mobile switching centers MSC are furthermore connected to, in each case, at least one base station controller BSC. Each base station controller BSC, in turn, facilitates a connection to at least one base station BS. A base station BS of this type can set up a message connection to subscriber stations MS over a radio interface. said the base station BS is fitted with antenna equipment having several antennas, in this case two antennas $A_1, A_2$. The antennas $A_1, A_2$ receive a downlink signal having a multiplicity of components from the base station BS. A group of the components are what are termed dedicated channels which transmit symbols intended, in each case, for a single subscriber station MS. The dedicated channel can be envisaged as being subdivided into a useful data channel on which the useful data intended for the assigned subscriber station is transmitted, and a pilot-bit channel (Dedicated Pilot CHannel DPCH in the UMTS system) on which a train of pilot bits known to the subscriber station MS is transmitted.

Figure 2:
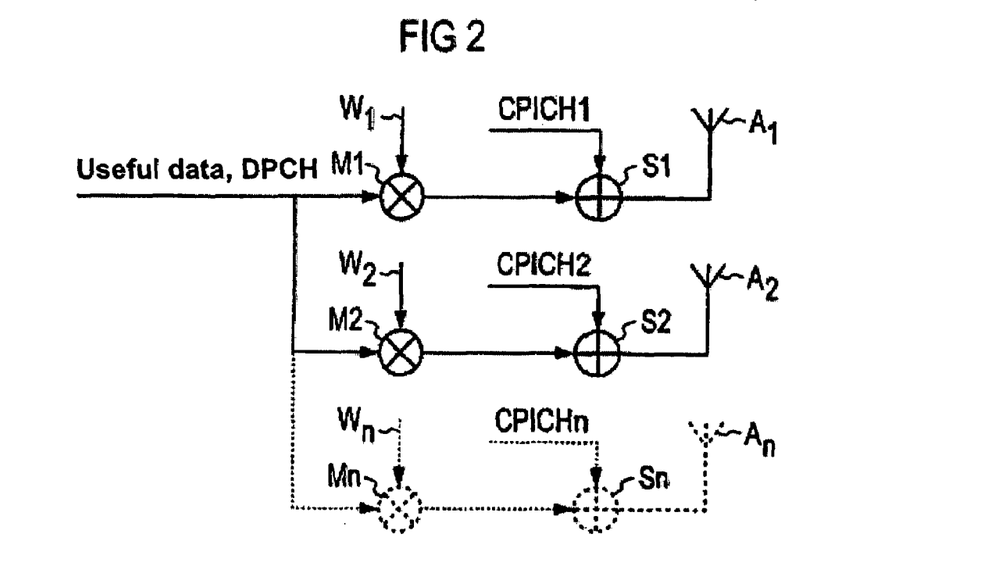
FIG. 2 is a block diagram of the transmitter stage of a base station of the radio communications system from FIG. 1.

As shown in FIG. 2, the symbols of the useful data channel and dedicated pilot-bit channel DPCH are multiplied, in each case, in multipliers M1, M2 in the transmitter stage of the base station BS with coefficients $w_1, w_2$ of a weighting vector W; the signals transmitted by the antennas $A_1, A_2$ are in this way superimposed with a phase shift and an amplitude ratio resulting in directional propagation of the dedicated channel on the radio path.

The output signal of the multipliers M1, M2 traverses, in each case, an adder S1, S2 via which pilot-bit trains CPICH1, CPICH2 of the global pilot-bit channel CPICH are routed to the antennas $A_1, A_2$. The simultaneously transmitted pilot-bit trains CPICH1, CPICH2 are mutually orthogonal and propagate non-directionally in the radio cell. Because is must be possible for all subscriber stations in the radio cell to receive them, they are generally transmitted at a higher power level than the dedicated channel.

The transmitter part, as shown in FIG. 2 with a dotted line, also can, of course, contain more than two antennas supplied in each case with different global pilot-bit trains and a weighted downlink signal.

The global pilot-bit trains' orthogonality allows the subscriber stations, in a manner known per se, to separate the portions of the various pilot-bit trains CPICH1, CPICH2 in a receive signal and perform a channel estimation separately for each of these trains. The estimation provides information about the loss and phase shift on the transmission channel from the antenna $A_1$ or $A_2$ to the subscriber station MS. The channel estimation can be made with a good degree of accuracy owing to the relatively high level of transmitting power of the pilot-bit channel CPICH.

This description proceeds for simplicity's sake mostly on the basis of two antennas on the part of the base station. The present invention can, however, be applied in like manner when more than two antennas are used, even when explicit reference is not made to this in the individual embodiments described. It also will be set out in the following that many variations of the method according to the present invention can be implemented more efficiently with several antennas than with few antennas.

Figure 3:
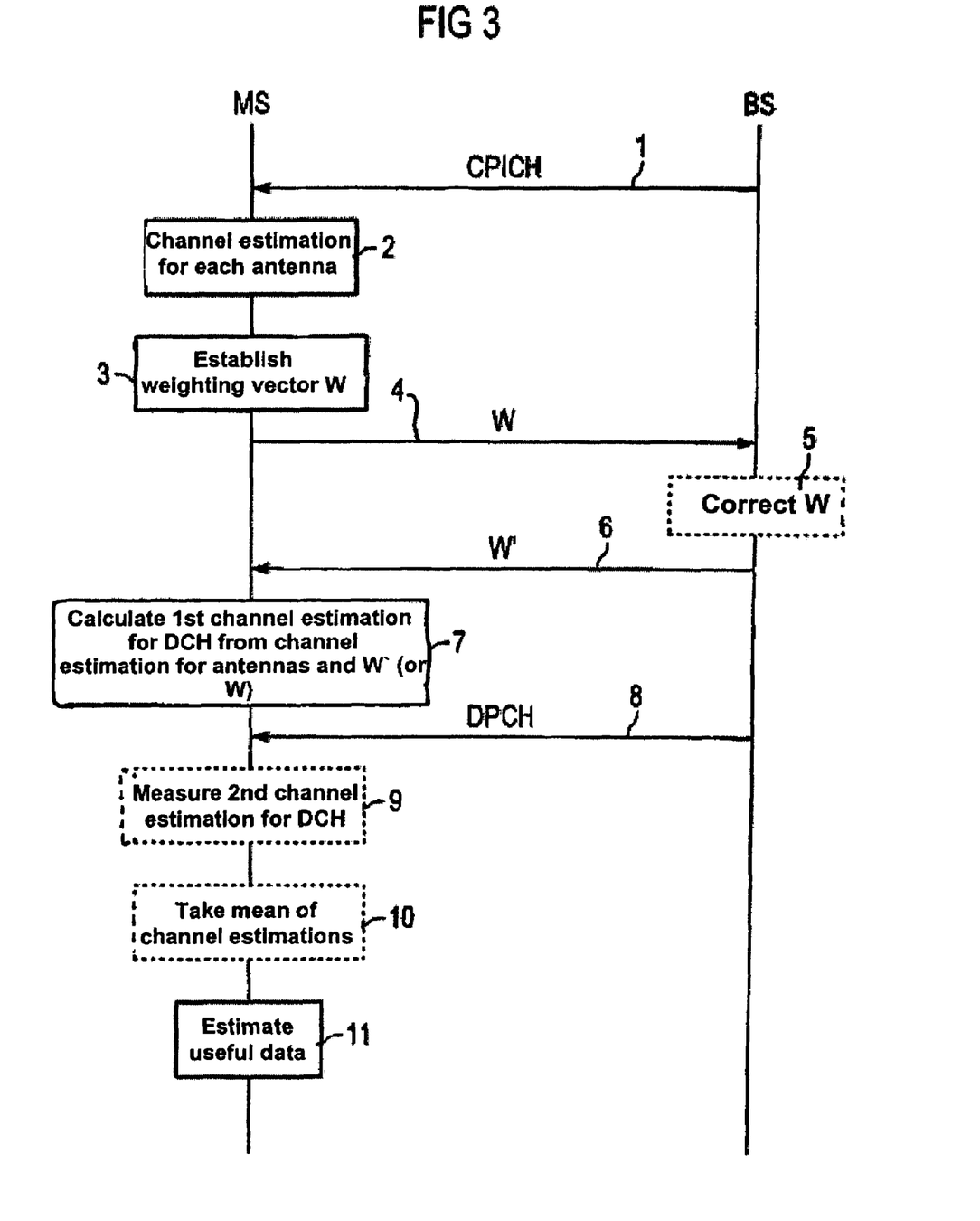
FIG. 3 is a schematic representation of the procedural steps executed by the base station and subscriber station according to a first embodiment of the present invention.

FIG. 3 shows the flow of the method according to the present invention in a mobile radio communications system with downlink-based beam forming. Downlink-based beam forming refers to, in each case, the subscriber station MS using measurements performed periodically on the downlink signal to establish a weighting vector W which, were it to be used by the base station, would allow the downlink signal to be received with maximum receive power, and transmitting to the base station feedback information specifying the established weighting vector W.

These procedural steps are represented by steps 1 to 4 in the diagram in FIG. 3. In step 1, the base station transmits the global pilot signals CPICH to all subscriber stations MS in its radio cell. The common pilot signals being different for each antenna $A_1, A_2$ of the base station, the subscriber station MS is able to split the received pilot signals into the components CPICH1, CPICH2 of the two antennas $A_1, A_2$ and perform a channel estimation individually for each antenna. By using these channel estimations, in step 3 an optimal phase difference is established which, were it to be between the signals transmitted by the antennas $A_1, A_2$, would result in their co-phasal superimposition at the subscriber station MS, and a desired amplitude ratio also may be established.

Two operating states with downlink-based beam forming are defined in the UMTS standard, one designated closed-loop mode 1, in which only the phase of the signals transmitted by the two antennas is established with a resolution of $\pi/2$, and what is termed closed-loop mode 2, in which the relative phase is established with a resolution of $\pi/4$ and two different amplitude ratios of the antenna signals can be selected.

In step 4, the information about the weighting vector established by the subscriber station MS is transmitted to the base station BS. This information includes two bits in closed-loop mode 1 and four bits in closed-loop mode 2 and is, accordingly, transmitted distributed over two or four timeslots. Unless measured from the outset with a suitable resolution, the phase difference and the amplitude ratio are rounded up by the subscriber station MS to values which can be represented with the information.

The base station BS thus has knowledge of all the weighting vectors W required by the various subscriber stations MS provisioned by it. It may be expedient not to use for each subscriber station MS exactly the weighting vector W established by that station and specified via the information transmitted in step 4, but instead to undertake corrective adjustment of the weighting vectors in advance in step 5. The prerequisites for an implementation of this optional step will be dealt with in greater detail further below.

In step 6, to each subscriber station the base station transmits information defining the weighting vector W', which the base station will soon use for weighting the dedicated downlink channel for this subscriber station MS. If step 5 is not executed, W'=W and the sole function of step 6 is to confirm to the subscriber station MS that the base station has correctly received the information transmitted in step 4.

Having knowledge of the weighting vector W', which the base station will use, in step 7 the subscriber station MS calculates a first channel estimation for the dedicated channel from the phase shift and loss values received for each antenna in step 2 and from the weighting vector W'. Via the dedicated pilot-bit channel DPCH transmitted weighted with the weighting vector W' in step 8, in step 9 the subscriber station MS performs a second channel estimation for the dedicated channel. As the second channel estimation is known from the prior art, its implementation need not be described in detail at this point.

A definitive channel estimation is obtained in step 10 by taking a mean of the estimation results obtained in steps 7 and 9. This channel estimation is used in step 11 to estimate the useful data transmitted on the dedicated channel. A mean is expediently taken of the two channel estimations according to their quality, which generally results in greater weighting for the channel estimation based on the common pilot than the channel estimation based on the dedicated pilot-bit channel DPCH.

The method can be simplified by omitting steps 9 and 10, in which case the useful data is estimated solely on the basis of the channel estimation obtained in step 7.

A further variant of the method relates to the weighting vector used in step 7 for the channel calculation. This weighting vector also can, of course, be the weighting vector W originally established by the subscriber station. Departures from the above described method can only arise if an error has occurred during the transmission of information in steps 4 or 6 so that the vector W' specified with the information transmitted to the subscriber station MS in step 6 is no longer the same as the weighting vector W.

Whereas at one bit per timeslot the bandwidth available for transmitting the feedback information in step 4 is extremely limited in the UMTS system, a larger bandwidth can be made available for transmission in the opposite direction in step 6. A development of the method therefore provides for transmitting the information specifying the vector W' in step 6 in encoded form with an error correction code permitting the subscriber station MS to detect and possibly eliminate transmission errors. This can be implemented simply by, for example, transmitting the information in step 6 at a higher level in the OSI layer model than the bit layer.

In order to keep the bandwidth required for transmitting the information in step 6 low, a provision of another development is for this information to specify the weighting vector with a lower resolution than the feedback information supplied by the subscriber station in step 4. As such, the amount of weighting vectors W' specifiable with the information transmitted in step 6 is a subset of the possible weighting vectors W which the subscriber station is able to establish. This is particularly expedient in a case where the subscriber station calculates the first channel estimation using the weighting vector W originally established by it and transmission of the information specifying the vector W' only signifies confirmation of reception.

Figure 4:
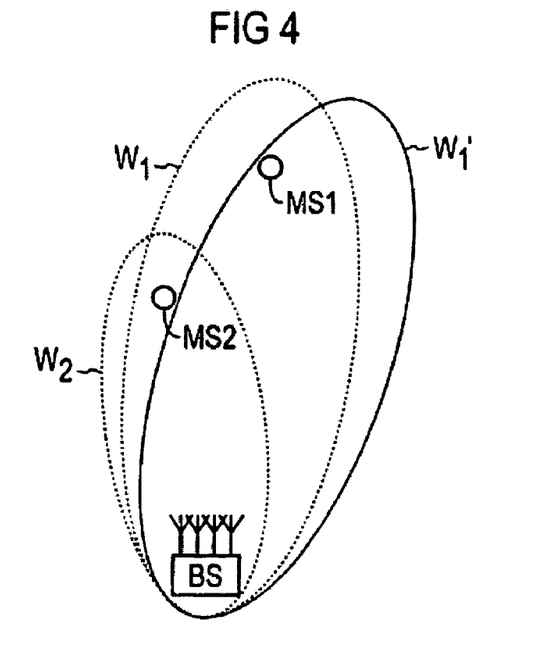
FIG. 4 shows the orientation of the directional characteristics of two dedicated channels in the event of the base station's performing a correction of the weighting vectors.

Corrective adjustment in step 5 at the base station BS of the weighting vector W established by the subscriber station MS will now be explained with the aid of FIG. 4. This is a schematic representation of the geographical locations of two subscriber stations MS1, MS2 in relation to a base station BS communicating with both. Each of these subscriber stations MS1, MS2 establishes the weighting vector W1 or W2, to be used by the base station when transmitting the dedicated channel, in such a way that a directional characteristic results which radiates with maximum intensity toward the relevant subscriber station MS1 or MS2. These directional characteristics are shown in FIG. 4 as dotted ellipses and, for simplicity's sake, are designated with the same symbols W1, W2 as the weighting vectors corresponding to them. In keeping with the different distances of the subscriber stations MS1, MS2 from the base station BS, each requires a different transmit power in the downlink, shown symbolically by the different size of the ellipses W1, W2. The two subscriber stations MS1, MS2 forming only a slight angle referred to the base station, the dedicated channel intended for the more distant subscriber station MS1, if transmitted weighted with W1, will reach the closer subscriber station MS2 with a higher field strength than such station's own dedicated channel, represented by ellipse W2. This can result in substantial interference from the dedicated channel of the subscriber station MS1 on the reception of the station MS2. To prevent this, the base station BS performs a corrective adjustment of the weighting vector W1 to W1', corresponding to a beam characteristic slightly rotated against W1. The resulting reduction in receive field strength at the subscriber station MS1 is relatively small. The reduction in the receive field strength of the dedicated channel intended for MS1 at the station MS2 is, by contrast, much greater. Only by performing this corrective adjustment is it possible to make the receive field strength of the dedicated channel of MSI at the station MS2 smaller than that of its own dedicated channel.

The precise type of corrective adjustment can be performed in various ways and also can have different optimizing criteria as the objective. It is possible, for instance, to optimize the signal-to-noise ratio received at the location of individual mobile stations, or a possibly weighted mean signal-to-noise ratio of all mobile stations. In an extreme case, it is also possible to include mobile stations of other cells, for which naturally only the interference can be minimized through beam forming of the signals of the relevant cell. If the number of mobile stations is relatively small, it is even possible to achieve a state whereby signals intended for a specific mobile station are transmitted in such a way that no interference occurs at the location of the other mobile stations (referred to as a "nulling"). A method of this type basically results in not inconsiderable corrective adjustments of the weighting vector. Although no further details of them are given here, other correction algorithms also can be applied within the scope of the present invention.

The beam forming gain which can be achieved through the design-based superimposition of the signals for the mobile radio station for which a specific dedicated channel is intended is relatively insensitive within the range of the maximum to minor changes to the weighting vector so that, as described in the preceding, the weighting vectors for this type of optimizing can be relatively coarsely discretized. Expressed more precisely, the information specifying a weighting vector of this type can be transmitted in step 4 using discretizing which tends toward greater coarseness. Conversely, this does not apply to the suppression of the signals for other mobile radio stations; in particular, if the interference is to be completely suppressed. The reason for this is that a typical function within the range of the maximum is, in relative terms, very constant, whereas within the range of a null it shows very major relative changes. In the case where a corrective adjustment is made to the weighting vectors it consequently can be advantageous to employ finer discretizing for transmitting the information specifying the weighting vectors to the mobile radio station (step 6); in particular, where applicable, finer discretizing than is used for transmitting the information from the mobile radio station to the base station.

It can be readily appreciated that the significance of a corrective adjustment of this type is greater the narrower the radiation characteristics of the base station, which is to say the greater the number of antennas on a base station which can be used or beam forming. Interference suppression for other mobile stations furthermore can be performed more effectively with an increasing number of antennas.

Figure 5:
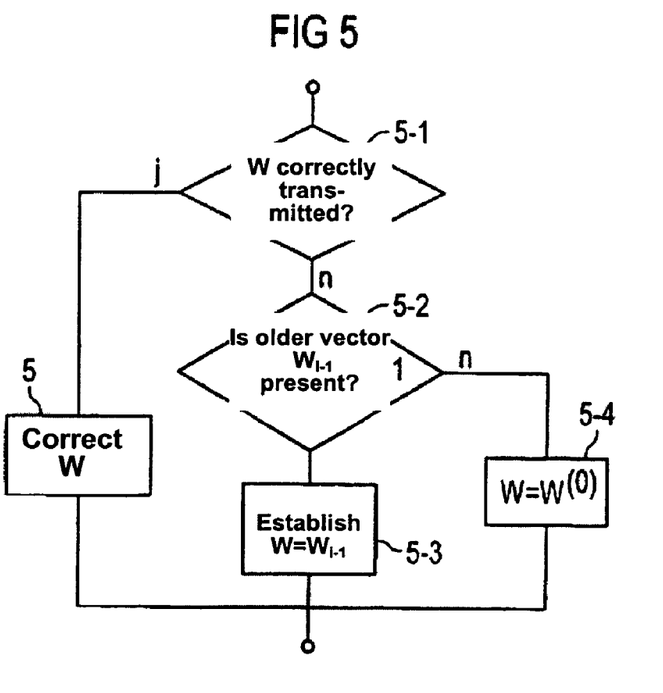
FIG. 5 shows a development of the procedure described with reference to FIGS. 3 and 4.

As shown in FIG. 5, in a development of the present invention, a check 5-1 is connected upstream of the correction step 5 to ascertain whether the information was correctly received in step 4. The weighting vector specified by the information will only be corrected (step 5) if that is the case. The base station BS will otherwise check whether an older weighting vector $W_{i-1}$ has been stored at the base station BS from an earlier timeslot of the dedicated channel. If so, this vector $W_{i-1}$ will be re-used as the weighting vector (step 5-3). If beam forming has not yet been correctly initialized and a vector $W_{i-1}$ does not exist, the base station will use a default weighting vector $W^{(O)}$ (step 5-4).

Figure 6:
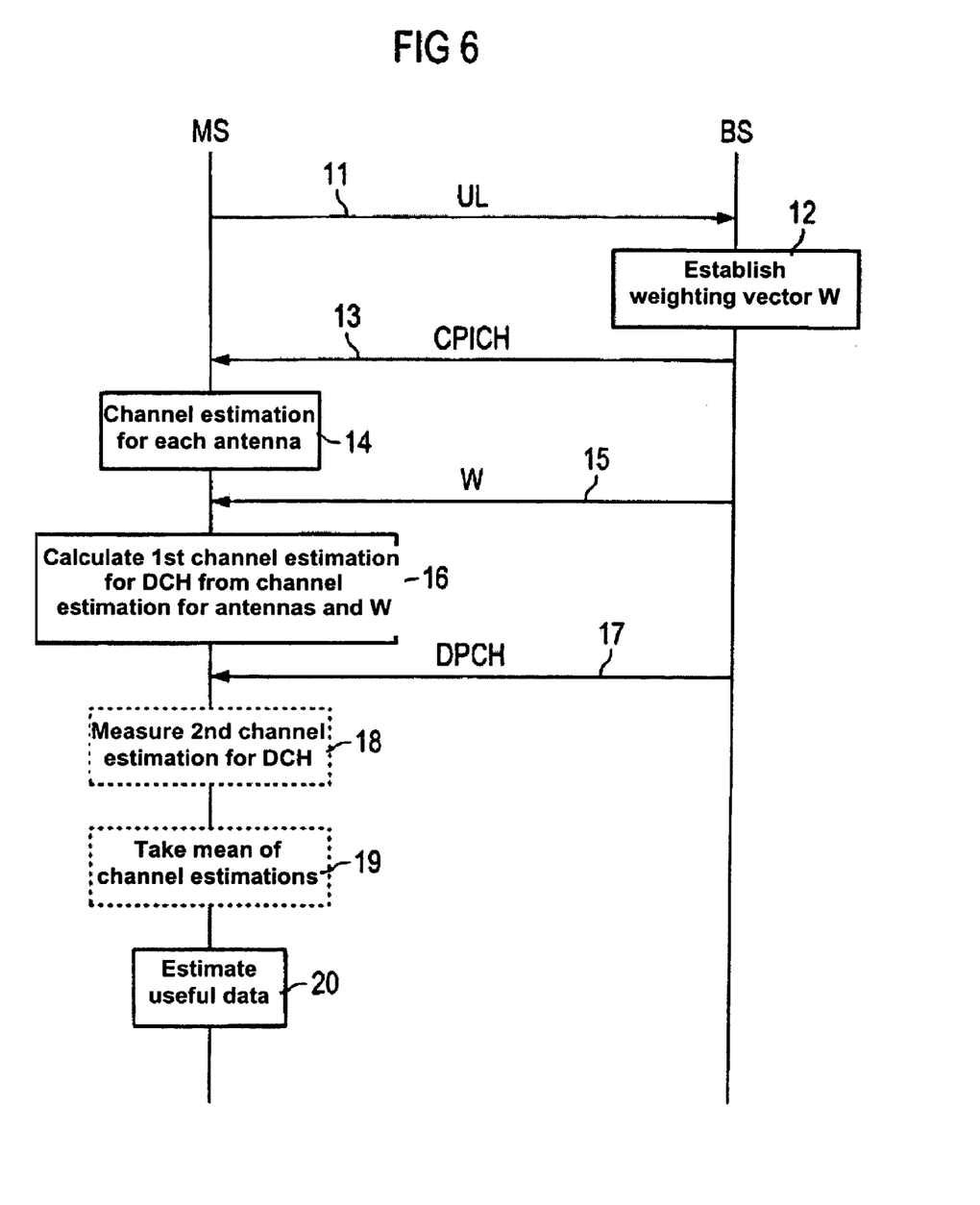
FIG. 6 is a schematic representation of the procedural steps according to a second embodiment of the present invention.

In a representation analogous to FIG. 3, FIG. 6 shows the application of the present invention to a mobile radio communications system with uplink-based beam forming. The principle of uplink-based beam forming is that the base station BS establishes a weighting vector W (step 12) via an uplink signal transmitted by a subscriber station MS (step 11).

An example of a system of this type is the UMTS system in the FDD mode. The weighting vector W here is established via channel estimations, performed individually for each antenna, of the radio channel from the subscriber station MS to the relevant antenna. Because the uplink and downlink frequencies differ in the FDD mode, the phase shifts measured for the uplink here have to be converted into phase shifts of the downlink before estimation results obtained on the uplink are used for beam forming of the downlink. An estimation obtained for the uplink channel can only be transferred identically to the downlink channel if the uplink and downlink signals use the same frequencies in, say, a time division duplex (TDD) mode.

Step 13 including transmission by the base station BS of the global pilot-bit channel CPICH and step 14 including channel estimation by the subscriber station MS for each antenna $A_1$, $A_2$ of the base station are identical to steps 1, 2 in FIG. 3.

The weighting vector W can be established at the base station BS solely via the uplink channel estimation of the subscriber station MS for which the weighting vector W has been determined, but it is also possible, as described with reference to FIG. 4, for the base station to perform corrective adjustment of the weighting vector W with knowledge of the weighting vectors to be used for other subscriber stations.

Information specifying the weighting vector W established in this way is transmitted in step 15 to the subscriber station MS. In the same manner described above for step 7, said the subscriber station MS performs a first channel estimation for the dedicated channel by calculating the estimation from the global channel estimations obtained in step 14 and the specified weighting vector W. The ensuing steps of transmitting 17 the dedicated pilot-bit channel DPCH, of second channel estimation 18 via the channel DPCH, of taking a mean 19, and of estimating 20 the useful data are the same as described above with reference to FIG. 3.

Like steps 9, 10 of the method in FIG. 3, steps 18, 19 also can be omitted; in this case, the useful data is estimated in step 20 exclusively via the first channel estimation of step 16.

There may be temporary interruptions to the uplink signal in the compressed mode of the UMTS system so that the base station is unable in individual timeslots to establish the weighting vector as described above with reference to step 12.

Figure 7:
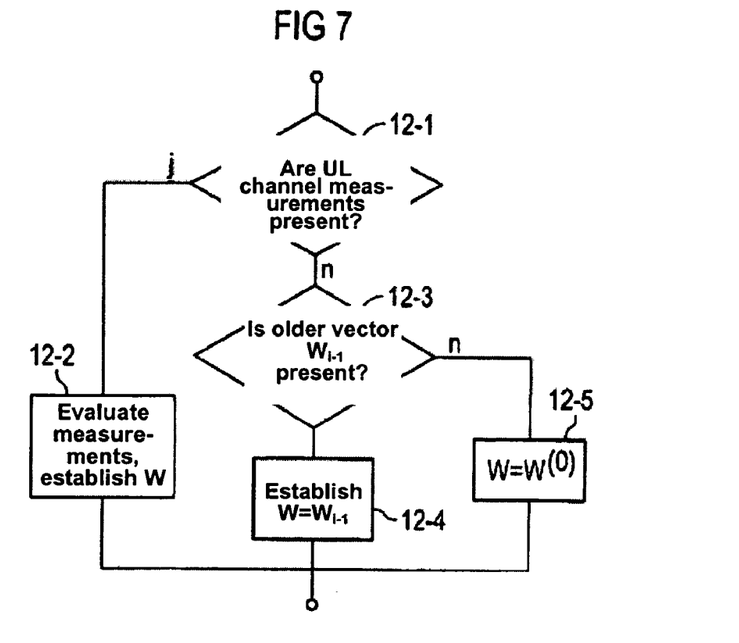
FIG. 7 shows a development of the procedure from FIG. 6.

FIG. 7 shows a development of step 12 which takes account of this. The base station here first checks in step 12-1 whether it was possible to perform uplink channel measurements. W will only be established in step 12-2 via these measurements if it was possible. A check will otherwise be carried out in step 12-3 to ascertain whether an older weighting vector $W_{i-1}$ used in a previous downlink timeslot is known. If it is, $W=W_{i-1}$ will be established, and if it is not, $W=W^{(O)}$ will be established, where $W^{(O)}$ is a specified default vector.

The second preferred application of the present invention will now be described and will consider a mobile radio communications system with a base station BS having an antenna arrangement with several antennas, and subscriber stations MS, as described with reference to FIG. 1.

The base station BS continuously receives uplink bursts from each subscriber station MS with which it communicates. These bursts usually reach the base station BS over several propagation paths V1, V2, Vk, with the individual propagation paths being exposed to statically varying loss (fast fading). A downlink signal from the base station BS reaches the subscriber station MS on the same propagation paths V1, V2, Vk in the opposite direction. These propagation paths have, in each case, corresponding weighting vectors which can be used by the base station BS when transmitting to a subscriber station MS or when receiving from it in order to radiate preferably in the direction of this propagation path or receive from there. Each individual propagation path can be assigned a weighting vector; however, a weighting vector can also correspond to a propagation mode, with such mode being understood as, in each case, a totality of propagation paths having a common, correlated fading characteristic, and with the fading characteristic of different propagation modes being as uncorrelated as possible.

The base station BS is able, for example through application of the method described in the patent application officially referenced 100 32 426.6, to determine weighting vectors of this type for the uplink by performing measurements on the uplink bursts. These weighting vectors only change slowly when the subscriber station moves relative to the base station and are, for this reason, also referred to as long-term weighting vectors. A set of eigenvectors of this type can be calculated via, for example, an eigenvalue analysis of the covariance matrix, with the matrix containing the mean correlation of the signals received via different antennas.

If the frequencies for the uplink and downlink are the same, the weighting vectors obtained in this way also will be suitable weighting vectors for the downlink; if the frequencies are different, long-term weighting vectors for the downlink can be calculated in a simple way from those for the uplink if account is taken of the different frequencies in the uplink and downlink. However, in contrast to fast fading, this is only relevant if the antenna distances are relatively large; that is to say, if the distance between the antennas, expressed as a multiple of the wavelength of the uplink or downlink frequency, is significantly different. Frequently, when the difference between these two expressions is small, it will not be necessary to perform a corrective adjustment if this type. The corrective adjustment otherwise can be performed by, for example, requiring that, in each case, the same preferred propagation direction or an as similar as possible radiation pattern with reference to the base station should correspond to the two weighting vectors.

From time to time, in a cadence of several minutes, for example, or as and when required, when the long-term weighting vectors have changed, the base station BS transmits to the subscriber stations MS communicating with it information specifying for each subscriber station a set of long-term downlink weighting vectors which the base station BS has measured or calculated for the relevant subscriber station MS.

The subscriber stations each store the set intended for them and supply short-term feedback information to the base station which specifies a weighting vector from the set or a linear combination of weighting vectors of the set which, taking account of the current fading situation at the subscriber station, allows optimum reception of the downlink signal for said the subscriber station. The vector specified in this way then continues to be used by the base station BS for beam forming of the downlink signal until the subscriber station MS supplies updated feedback information.

The subscriber stations can have a simple structure as they need only be able to select the vector best-suited at a given time (or the best-suited linear combination) from among the weighting vectors stored and do not have to calculate the weighting vectors themselves.

Figure 8:
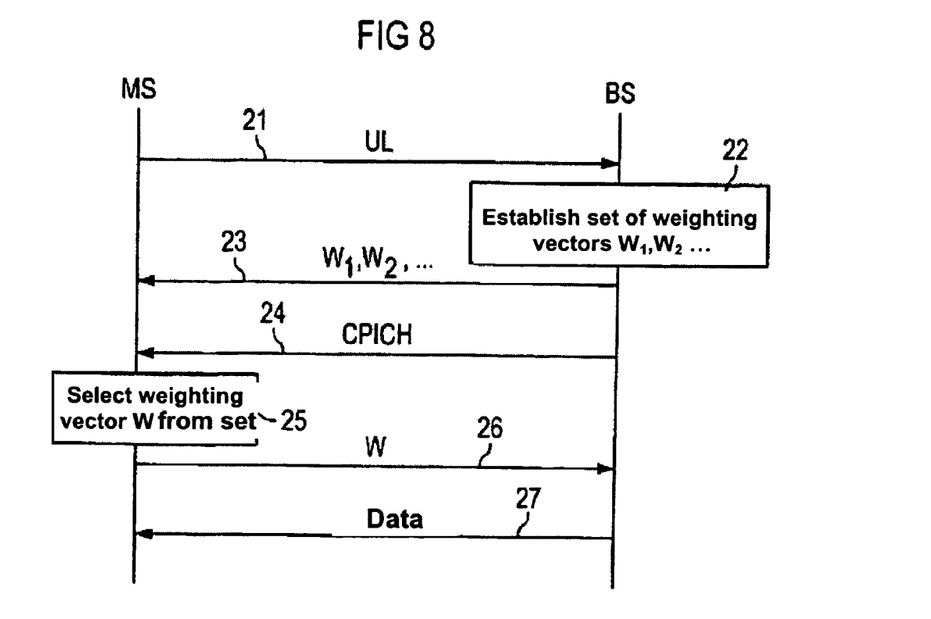
FIG. 8 is a schematic representation of procedural steps executed by the base station and subscriber station according to a third embodiment of the present invention.

FIG. 8 shows the exchange of messages between the base station BS and subscriber station MS within the scope of the second application of the present invention. Via an uplink signal 21 transmitted by the subscriber station MS, the base station BS here establishes a set of weighting vectors $W_1$, $W_2$, ... corresponding, in each case, to individual transmission paths or transmission modes from the base station BS to the subscriber station MS. This set of weighting vectors is transmitted in step 23 to the subscriber station MS and stored there. Via the pilot-bit channel CPICH 24 transmitted periodically by the base station BS, in step 25 the subscriber station MS selects from the set of weighting vectors or a linear combination of weighting vectors from this set, in each case, the weighting vector W which allows optimum reception of the dedicated channel for said the subscriber station MS. A designation of this weighting vector W or of this linear combination is transmitted in step 26 back to the base station BS, which then transmits the dedicated channel in step 27 weighted with the designated weighting vector.

In this embodiment, the subscriber station MS does not require any equipment for calculating the set of weighting vectors from the downlink signal. Suitable equipment, provided on the base station, for calculating the set from the uplink signal can provision a multiplicity of subscriber stations with suitable weighting vectors, in each case, in chronological order. This reduces the switching effort required for the mobile communications system compared to a system where the sets of weighting vectors are established by the subscriber stations; the subscriber stations thus being less complex to manufacture and being able to be sold at a lower price.

A further advantage is that the low bandwidth available for transmitting the feedback information for beam forming to the base station (only one bit per timeslot in the UMTS system), is available exclusively and permanently for transmitting short-term feedback information because no updated values for the weighting vectors have to be transmitted from the subscriber stations to the base station.

In a development of this embodiment of the present invention, the base station has more than two antennas but only transmits the common pilot-bit channel CPICH on two antennas. The subscriber station is therefore unable to determine favorable propagation modes or weighting vectors for more than these two antennas. It must be added, however, that the base station BS is able, via the uplink signal 21, to establish the components of the weighting vectors $W_1$, $W_2$, ... for all antennas. The base station BS then conveys to the subscriber station MS that part of the weighting vectors, expressed more precisely, those components of the weighting vectors, from two preferred propagation modes, relating to the two antennas used for transmitting the CPICH. As already described above, via this the subscriber station sends back to the base station BS short-term feedback information 26 which, taking account of the current fading situation at the subscriber station, specifies either the weighting vector allowing optimum reception at the subscriber station MS or, in an expanded embodiment, even a linear combination of both weighting vectors. The base station BS transmits the dedicated channel (step 27) on all antennas according to the selection made by the subscriber station MS from the weighting vectors established by the base station BS and uses the weighting vector components assigned to these antennas (which were not transmitted to the subscriber station) for the other antennas.

In contrast to the exemplary embodiment described in the preceding, only the components of the current channel information and of the weighting vectors relating to the two antennas used for transmitting the CPICH are available to the subscriber station MS. This is sufficient, however, for uniquely selecting a weighting vector from the set of two weighting vectors. The advantage of this method is that, on the one hand, a pilot signal only has to be transmitted via two antennas and that, on the other hand, the subscriber station only has to receive and process two such pilot signals, which brings a commensurate simplification compared to the case where a pilot signal would have to be sent via all antennas and then, of course, would have to be received and processed in the mobile station.

It is, of course, also possible for the base station BS to indeed transmit pilot signals on all antennas, but for a subscriber station to evaluate only two of said the pilot signals, identifiable by the pilot-bit trains contained therein, in order to determine the short-term feedback information 26. It makes no difference to the base station BS whether the subscriber stations MS communicating with it evaluate all or only individual pilot signals. The base station BS can therefore interoperate indiscriminately with both types of subscriber stations.

The preceding exemplary embodiment can readily be generalized for any number of antennas, with a pilot signal being transmitted only via a subset of these antennas.

Although the present invention has been described with reference to specific embodiments, those of skill in the art will recognize that changes may be made thereto without departing from the spirit and scope of the present invention as set forth in the hereafter appended claims.

The invention claimed is:

1. A method for operating a mobile radio communications system, the method comprising:
   providing at least one subscriber station in the mobile radio communications system;
   providing a base station in the mobile radio communications system having antenna diversity which transmits to the at least one subscriber station over a dedicated channel;
   transmitting, from the base station to the at least one subscriber station, specific information clearly defining a weighting vector used for beam forming of the dedicated channel;
   performing, at the base station, information specifying the weighting vector to be used in advance from the at least one subscriber station;
   transmitting, at the base station, a corrective adjustment of the weighting vector specified by the information received from the at least one subscriber station; and
   employing the corrected weighting vector thus obtained for beam forming of the dedicated channel;
   wherein the corrective adjustment is performed such that, on at least one second subscriber station for which the dedicated channel is not intended, a receive field strength of the dedicated channel is reduced.

2. A method for operating a mobile radio communications system as claimed in claim 1, wherein the base station transmits the information specifying the weighting vector used in discretized form.

3. A method for operating a mobile radio communications system as claimed in claim 2, wherein the base station transmits the information specifying the weighting vector encoded with an error correction code.

4. A method for operating a mobile radio communications system as claimed in claim 3, wherein the at least one subscriber station calculates a first estimation of the dedicated channel from an estimation of a global channel via the specified weighting vector.

5. A method for operating a mobile radio communications system as claimed in claim 4, wherein the subscriber station obtains a supplementary second estimation via a measurement performed on the dedicated channel and calculates a final estimation of the dedicated channel by taking a mean of the first and second estimations.

6. A method for operating a mobile radio communications system as claimed in claim 1, wherein the base station receives the information from the at least one subscriber station in discretized form, with coarser discretizing being employed for transmission to the at least one subscriber station than for reception from the at least one subscriber station.

7. A method for operating a mobile radio communications system as claimed in claim 1, wherein the base station receives the information from the at least one subscriber station in discretized form, with finer discretizing being employed for transmission to the at least one subscriber station than for reception from the at least one subscriber station.

8. A method for operating a mobile radio communications system as claimed in claim 4, wherein the base station establishes the weighting vector via a measurement performed on a received uplink signal from the at least one subscriber station.

9. A method for operating a mobile radio communications system as claimed in claim 8, wherein the base station performs a corrective adjustment of the established weighting vector and employs the corrected weighting vector thus obtained for beam forming, with the information transmitted to the at least one subscriber station being referred to the corrected weighting vector.

10. A method for operating a mobile radio communications system as claimed in claim 4, wherein the at least one subscriber station establishes the weighting vector to be employed by the base station and uses the weighting vector for estimating the dedicated channel and transmits to the base station information specifying the weighting vector to be employed by the base station.

11. A method for operating a mobile radio communications system as claimed in claim 1, wherein the base station establishes a weighting vector autonomously if the base station does not receive the information specifying the weighting vector to be used, and transmits information specifying the established weighting vector to the at least one subscriber station.

12. A method for operating a mobile radio communications system as claimed in claim 11, wherein the base station establishes the weighting vector from among weighting vectors previously used by the base station.

13. A method for operating a mobile radio communications system as claimed in claim 11, wherein the base station establishes a specified default weighting vector.

14. A method for operating a mobile radio communications system as claimed in claim 1, wherein the base station determines a set of weighting vectors suitable for downlink beam forming via measurements performed on an uplink signal from the at least one subscriber station, with the information transmitted to the at least one subscriber station in each case specifying weighting vectors of the set.

15. A method for operating a mobile radio communications system as claimed in claim 14, wherein the at least one subscriber station supplies short-term feedback information to the base station which specifies at least one of a selection and a linear combination of weighting vectors of the set.

16. A method for operating a mobile radio communications system as claimed in claim 14, wherein the information transmitted to the at least one subscriber station only specifies specific components of the weighting vectors.

17. A method for operating a mobile radio communications system, the method comprising:
 providing at least one subscriber station in the mobile radio communications system;
 providing a base station in the mobile radio communications system having antenna diversity which transmits to the at least one subscriber station over a dedicated channel;
 establishing, at the base station, a weighting vector via a measurement performed on a received uplink signal from the at least one subscriber station;
 performing, at the base station, a corrective adjustment of the established weighting vector;
 transmitting, from the base station to the at least one subscriber station information specifying the corrected weighting vector; and
 employing the corrected weighting vector thus obtained for beam forming of the dedicated channel;
 wherein the corrective adjustment is performed such that, on at least one second subscriber station for which the dedicated channel is not intended, a receive field strength of the dedicated channel is reduced.

18. A subscriber station for a mobile radio communications system having a base station comprising:
 parts for transmitting a global channel and a dedicated channel intended for an individual subscriber station;
 parts for transmitting the subscriber station, specific information clearly defining a weighting vector used for beam forming of the dedicated channel;
 parts for performing information specifying the weighting vector to be used in advance from the subscriber station;
 parts for transmitting a corrective adjustment of the weighting vector specified by the information received from the subscriber station; and
 parts for employing the corrected weighting vector thus obtained for beam forming of the dedicated channel;
 wherein the corrective adjustment is performed such that, on at least one second subscriber station for which the dedicated channel is not intended, a receive field strength of the dedicated channel is reduced.

19. A base station for a mobile radio communications system, comprising:
 parts for transmitting a global channel and a dedicated channel intended for an individual subscriber station weighted with a weighting vector; and
 parts for transmitting specific information clearly defining the weighting vector;
 parts for establishing a weighting vector via a measurement performed on a received uplink signal from the at least one subscriber station;
 parts for performing a corrective adjustment of the established weighting vector;
 parts for transmitting to the individual subscriber station information specifying the corrected weighting vector; and
 parts for employing the corrected weighting vector thus obtained for beam forming of the dedicated channel;
 wherein the corrective adjustment is performed such that, on at least one second subscriber station for which the dedicated channel is not intended, a receive field strength of the dedicated channel is reduced.

20. A subscriber station for a mobile radio communications system having a base station comprising:

parts for transmitting information specifying an established weighting vector to be used by the base station for beam forming of a dedicated channel intended for the subscriber station;

parts for receiving information specifying a corrected weighting vector from the base station; and parts for receiving the dedicated channel from the base station intended for the subscriber station, the base station employing the corrected weighting vector for beam forming of the dedicated channel;

wherein a corrective adjustment is performed such that, on at least one second subscriber station for which the dedicated channel is not intended, a receive field strength of the dedicated channel is reduced.

21. A base station for a mobile radio communications system, comprising:

parts for transmitting a dedicated channel intended for an individual subscriber station via antenna diversity;

parts for receiving information specifying an established weighting vector from the individual subscriber station, wherein the weighting vector is to be used by the base station for beam forming of a dedicated channel intended for the individual subscriber station;

parts for performing a corrective adjustment of the established weighting vector;

parts for transmitting to the individual subscriber station information specifying the corrected weighting vector; and parts for employing the corrected weighting vector thus obtained for beam forming of the dedicated channel;

wherein the corrective adjustment is performed such that, on at least one second subscriber station for which the dedicated channel is not intended, a receive field strength of the dedicated channel is reduced.

22. A method for operating a mobile radio communications system, the method comprising:

providing at least one subscriber station in the mobile radio communications system;

providing a base station in the mobile radio communications system having antenna diversity which transmits to the at least one subscriber station over a dedicated channel;

transmitting, from the base station to the at least one subscriber station, specific information clearly defining a weighting vector used for beam forming of the dedicated channel;

performing, at the base station, information specifying the weighting vector to be used in advance from the at least one subscriber station;

transmitting, at the base station, a corrective adjustment of the weighting vector specified by the information received from the at least one subscriber station, the corrective adjustment being performed such that, on at least one second subscriber station for which the dedicated channel is not intended, a receive field strength of the dedicated channel is reduced; and employing the corrected weighting vector thus obtained for beam forming of the dedicated channel;

wherein the base station performs a corrective adjustment of the established weighting vector and employs the corrected weighting vector thus obtained for beam forming, with the information transmitted to the at least one subscriber station being referred to the corrected weighting vector.

* * * * *